(12) United States Patent
Justl et al.

(10) Patent No.: US 10,428,973 B2
(45) Date of Patent: Oct. 1, 2019

(54) POPPET VALVE

(71) Applicant: EVOGUARD GMBH, Nittenau (DE)

(72) Inventors: Johann Justl, Sinzing (DE); Martin Sauer, Kaisheim (DE)

(73) Assignee: Evoguard GmbH, Nittenau (DE)

( * ) Notice: Subject to any disclaimer, the term of this patent is extended or adjusted under 35 U.S.C. 154(b) by 0 days.

(21) Appl. No.: 15/974,289

(22) Filed: May 8, 2018

(65) Prior Publication Data

US 2018/0328506 A1    Nov. 15, 2018

(30) Foreign Application Priority Data

May 10, 2017   (DE) .................. 10 2017 207 933

(51) Int. Cl.
*F16K 1/32*      (2006.01)
*F16K 41/12*     (2006.01)
*F16K 27/02*     (2006.01)

(52) U.S. Cl.
CPC .............. *F16K 41/12* (2013.01); *F16K 1/32* (2013.01); *F16K 27/0236* (2013.01)

(58) Field of Classification Search
CPC ......... F16K 41/12; F16K 27/0236; F16K 1/32
USPC .................................. 251/331, 335.2; 92/99
See application file for complete search history.

(56) References Cited

U.S. PATENT DOCUMENTS

| 2,388,988 | A | * | 11/1945 | Mueser | ..................... F16K 7/16 251/265 |
| 3,414,235 | A | * | 12/1968 | Lumpp | .................... F16K 7/126 251/331 |
| 4,072,292 | A | | 2/1978 | Banon | |
| 4,666,166 | A | | 5/1987 | Hart et al. | |
| 4,856,757 | A | * | 8/1989 | Dall'Aglio | ................. F16J 3/02 251/335.2 |
| 7,661,437 | B2 | | 2/2010 | Schulz et al. | |

FOREIGN PATENT DOCUMENTS

| DE | 1500140 B1 | 4/1971 |
| DE | 102005016387 B3 | 9/2006 |
| WO | 2004013524 A1 | 2/2004 |

\* cited by examiner

*Primary Examiner* — John Bastianelli
(74) *Attorney, Agent, or Firm* — McCoy Russell LLP

(57) ABSTRACT

A poppet valve configured comprising a valve housing with line connections and a valve seat formed therebetween in the valve housing, and a closing element, which is axially displaceable in the valve housing and which cooperates with the valve seat, and a membrane extending around the closing element and from the latter up to a fixing site on the housing side. Due to the fact that a spring-elastic and in particular annular element is additionally provided for fixing the membrane under preload on the housing side, and due to the fact that the spring-elastic element is subdivided towards the sealing fixing site into partially circumferential segments having formed thereon extensions, which press the membrane against the cylindrical fixing site and, in so doing, deform the membrane.

20 Claims, 4 Drawing Sheets

POPPET VALVE

CROSS-REFERENCE TO RELATED APPLICATION

This application claims priority to German Patent Application No. 10 2017 207 933.9 entitled "POPPET VALVE" filed on May 10, 2017, the entire content of which is incorporated herein by reference in its entirety for all purposes.

BACKGROUND AND SUMMARY

The present disclosure relates to a poppet valve that can be used for aseptic product lines.

Poppet valves are used as seat valves, double seat valves or control valves for product guidance in the sphere of food production, beverage treatment and/or filling plants. Seat valves for hygienically demanding applications have valve stem seals, so as to seal the valve cavity during the valve stroke. In the case of aseptic applications, the areas through which the product flows have to be sealed hermetically against the surroundings and against drives and control units associated with these areas. For this purpose, the closing element projecting into the product space of the poppet valve can be sealed hermetically against the valve housing by bellows or a disk-shaped membrane.

A poppet valve comprising a disk-shaped membrane integrated in the closing element is known from EP 1 527 296 B1. The membrane is axially compressed at a fixing site, which is located on the side of the valve housing, in an axial direction between a stop formed on the valve housing and a sealing ring, and is fixed in this way.

DE 10 2005 016387 B3 additionally discloses a poppet valve comprising a disk-shaped membrane, which is fixed to the valve housing at an inner fixing site on the closing element and at an outer fixing site on the valve housing. The membrane is stabilized by support elements that interengage in the manner of a serrated lock washer, said support elements being fixed to the cover of the valve housing and to the stem of the closing element.

For sealing such membranes against the valve housing, elastomeric seals as well as a press fit without additional seals can be used. An aspect of elastomeric seals is that they are often not sufficiently resistant to products and/or cleaning media. Fixing the membranes by means of a press fit entails the risk of an excessive load on the membrane. Particularly problematic is the fixing of the membrane at a metal stop in the valve housing under a defined preload of the membrane. Moreover, reliable as well as infiltration-free sealing of the product space should be maintained over the longest possible service life.

U.S. Pat. No. 4,666,166 indeed suggests a disk spring for fixing a membrane, which is curved similar to a bellows, on the valve housing. However, this is only practicable for comparatively thick membranes and without any preload.

Hence, there is a demand for a poppet valve which is improved in comparison with this conventional art.

The posed task is solved by a poppet valve described herein. This poppet valve is suitable for aseptic product lines. The poppet valve comprises a valve housing with line connections and a valve seat formed between these line connections in the valve housing, a closing element, which is axially displaceable in the valve housing and which cooperates with the valve seat, and a membrane extending around the closing element and from the latter up to a fixing site on the housing side.

According to the present disclosure, the poppet valve additionally comprises a spring-elastic and/or annular element used for fixing the membrane under preload on the housing side. The spring-elastic element is here subdivided towards the fixing site into partially circumferential segments. These segments have additionally formed thereon extensions, which press the membrane against the fixing site that may be cylindrical and/or sectionwise conical and which, in so doing, compress the membrane. In the course of this process, the membrane is elastically compressed and potentially also plastically deformed, so that the extensions will dig into the membrane.

The partially circumferential segments allow the membrane to be uniformly pressed against the fixing site, which is located on the housing side, and they allow to achieve a reliable hermetic sealing of the valve cavity at the fixing site.

The extensions are configured such that, in the mounted condition, they engage the membrane under compression of the latter, without tearing the membrane. This may have the effect that the membrane is, at least partially, elastically compressed and potentially plastically, i.e. permanently, deformed. By penetrating/digging into the membrane, the extensions allow a connection between the spring-elastic element and the membrane in the area of the sectionwise cylindrical and/or conical fixing site in the pulling direction, whereby the membrane will be prevented from being torn out of the fixing site. Pulling forces acting on the membrane and, consequently, on the extensions will press the partially circumferential segments still further against the housing-side sealing site and/or against a sealing edge, and increase the sealing effect in this way.

In addition, the extensions and the membrane in the area of the fixing site may also engage one another at areas which have been preshaped such that they are adapted to one another. This means that the membrane is preshaped for form-fit engagement, e.g. with recesses complementary to the extensions.

The valve housing has potentially two line connections for a fluid, which may e.g. be a product, a product component, a cleaning medium, a supply medium or the like. The valve seat is potentially arranged at the transition of the valve housing to one of the line connections.

Two poppet valves of the type in question may, however, also be combined in series so as to form a double seat valve. Each poppet valve of the double seat valve will then have a membrane, a spring-elastic element and a fixing site, which cooperate according to at least one of the embodiments described.

The membrane is configured for hermetically sealing the valve cavity, which is enclosed by the valve housing, the valve seat, the closing element and the membrane.

The closing element comprises a valve disk and a valve stem. The membrane is either connected to the closing element at a further fixing site or formed integrally with the closing element.

Fixing the membrane under a preload means that the membrane is elastically stretched between the closing element and the housing-side fixing site in the closed condition of the poppet valve as well as in the open condition of the poppet valve.

The extensions are potentially formed integrally with the partially circumferential segments of the spring-elastic element. The extensions are e.g. finger-shaped and/or claw-shaped. The term "spring-elastic" means that a spring effect may be achieved by elastically bending individual supporting structures, but not by compressing them. Hence, the spring-elastic element acts as or similarly to a spring clip.

In one embodiment, the partially circumferential segments have a rounded and/or chamfered sealing profile in a contact area with the membrane. The sealing profile provides a sealing edge extending circumferentially around the spring-elastic element. This sealing edge is forced into the membrane and presses the latter along the entire circumference of the fixing site against the valve housing in a hermetically sealing manner. The individual partially circumferential segments allow the shape of the spring-elastic element to be adapted to the fixing site, which adaptation is due to manufacturing tolerances and/or the mounting positions of the spring-elastic element and of the membrane existing in practice at the fixing site.

In one embodiment, the extensions project at an oblique angle outwards from the partially circumferential segments such that they are directed away from the valve seat. This allows a permanently steady axial position of the membrane in spite of the preload and prevents the membrane from being torn out of the fixing site in spite of the dynamic load occurring when the poppet valve is in operation.

In one embodiment, a distance between the partially circumferential segments is, in a contact area with the membrane, smaller than the thickness which the fixed membrane has there. In this way, a reliable hermetic seal can be accomplished also in the circumferential subareas located between the segments. In particular, the product or the like can reliably be prevented from entering the area behind the membrane along the entire circumference of the membrane.

In one embodiment, the membrane has a substantially cylindrical outer edge portion, which is clamped in position between the extensions and the fixing site. The edge portion is potentially adapted to the original, i.e. still non-deformed contour of the spring-elastic element and configured elastically such that, when it is being installed in the valve housing, it will adapt itself to the cylindrical fixing site and create a preload in the extensions in this way.

In one embodiment, the poppet valve further comprises an anchoring ring for supporting and for form-fit anchoring of the spring-elastic element on the valve housing, and a support ring for supporting the membrane under preload, such as in the open condition of the valve. The anchoring ring and the support ring are interconnected in a form-fit manner or by a material bond, so as to fix the spring-elastic element between the fixing ring and the support ring. The connection can be established by a thread, by crimping, by a bayonet lock or by welding. This allows simple mounting of the membrane and of the spring-elastic element. The support ring is configured for supporting a radially outer portion of the membrane.

In one embodiment, the poppet valve further comprises a metal stop formed on the valve housing and used for axially anchoring the anchoring ring. The metal stop is formed in the area of a flange connection between the valve housing and the control casing. The anchoring ring can be installed in the separated condition of the flange connection and, when the flange connection has been closed, it is axially and possibly also radially fixed in the valve housing.

In one embodiment, the support ring has a support profile for the membrane, said support profile having a substantially concave curvature towards the valve seat. The membrane will then potentially rest on a support surface provided with the support profile along the entire circumference thereof. The concave curvature allows a uniform preload at different axial positions of the closing element.

In one embodiment, the poppet valve further comprises a support body secured to the closing element and used for supporting the membrane, such as in the closed condition of the valve. The support body is configured for supporting a radially inward portion of the membrane. The support body will then potentially have a support profile having a concave curvature, said support profile being formed on the support body towards the valve seat. This allows a uniform preload of the membrane in the closed or almost closed condition of the valve.

In one embodiment, the closing element comprises a valve disk and a valve stem, the membrane being fixed in position between the valve stem and the support body. The valve stem and/or the valve disk may be formed integrally or as multi-part components. The valve disk, the valve stem and the support body may be connected to one another e.g. by means of a central bolt.

In one embodiment, the spring-elastic element consists of a metal or a metal-containing composite material. In this way, the spring-elastic element will permanently press the membrane against the fixing site under a sufficiently high preload, even if the internal stress of the membrane should decrease. In addition, metals or metal-containing composite materials are particularly resistant to thermal loads and loads occurring during the mounting process.

In one embodiment, the spring-elastic element consists of a plastic material, in particular PEEK, or of a composite material containing plastic. This allows the spring-elastic element to be produced at a comparatively reasonable price by injection molding or the like.

In one embodiment, the plastic material or the composite material containing plastic will then be temperature resistant up to at least 150° C. and, in particular, up to at least 200° C. The poppet valve can thus be used for hygienically demanding treatments of products, e.g. in beverage treatment and/or filling plants, and in particular in/on aseptic product lines.

In one embodiment, the poppet valve is pneumatically driven and configured as an aseptic seat valve, aseptic double seat valve or aseptic control valve. The likewise thermally and mechanically stable fixing of the hermetically sealing membrane can be used in such valves in a particularly advantageous manner.

The posed task is also solved by a beverage treatment and/or filling plant utilizing the poppet valves of the embodiments. This plant comprises at least one poppet valve according to at least one of the above described embodiments.

BRIEF DESCRIPTION OF FIGURES

A preferred embodiment of the disclosure is shown in the drawings, in which.

DETAILED DESCRIPTION

Figure 1:
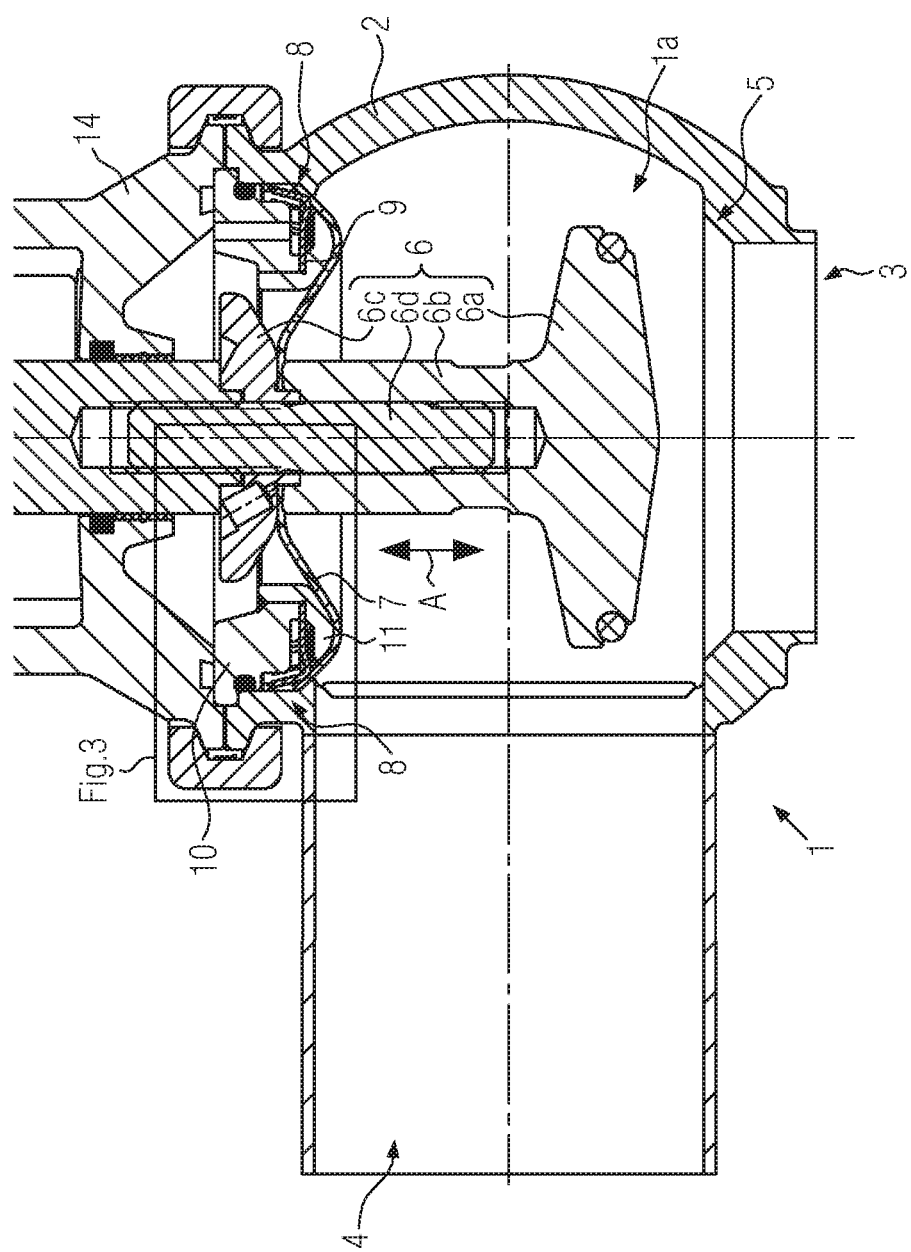
FIG. 1 shows a longitudinal section through the poppet valve.

As can be seen from FIG. 1, the poppet valve 1 is, in an embodiment, configured as a seat valve comprising a valve housing 2, a first line connection 3 and a second line connection 4 for a fluid. The fluid is a product, such as a beverage, a product component, a cleaning medium or the like. The valve housing 2 encloses a valve cavity 1a down to a valve seat 5 cooperating in the manner known with a closing element 6, which is displaceable in the valve housing 2 in an axial direction A.

The closing element 6 comprises a valve disk 6a, a valve stem 6b, a support body 6c for a membrane 7 and a central connecting bolt 6d. The membrane 7 extends around the closing element 6 in the shape of a disk and in a hermetically sealing manner, and from the closing element 6 up to a fixing site 8 located on the side of the housing. The membrane 7 is fixed in a force-fit manner e.g. between the valve stem 6b and the support body 6c. A radially inward portion 7a of the membrane 7 is supported by the support body 6c, in particular in the closed condition of the poppet valve 1, cf. also FIG. 3.

Figure 2:
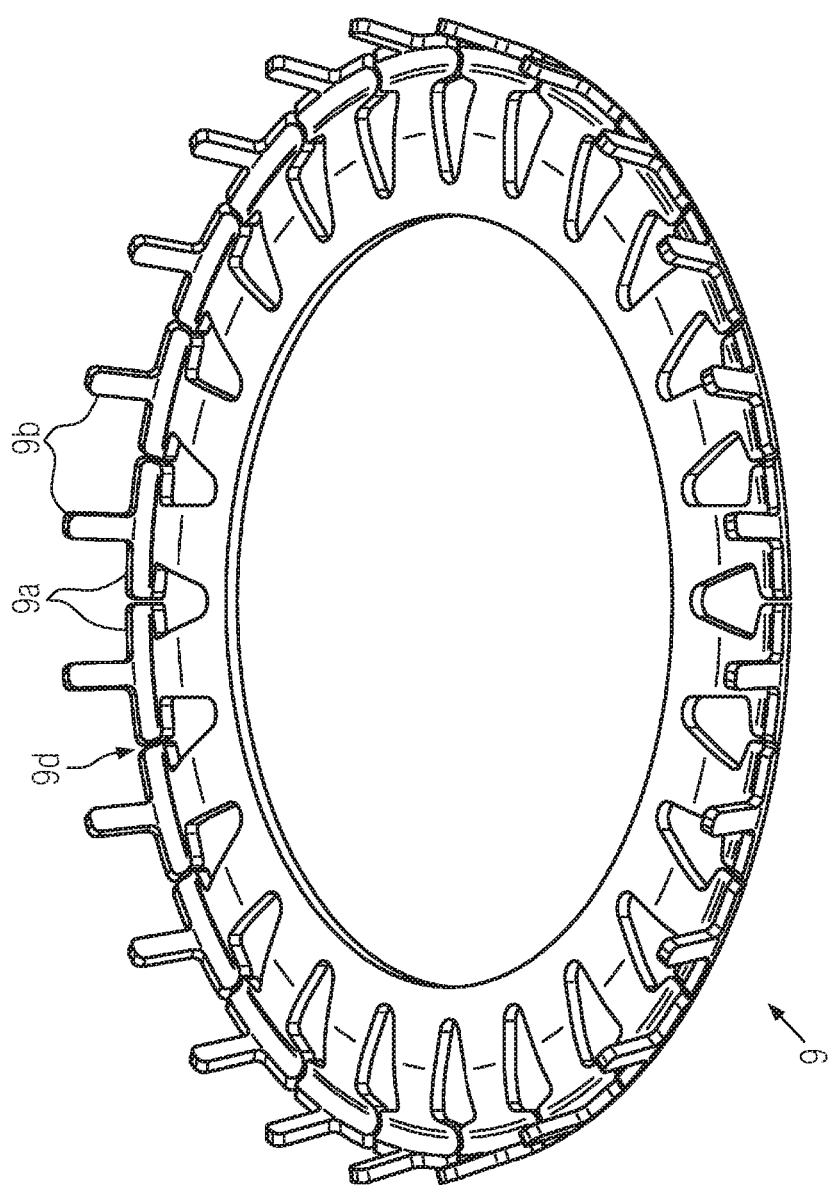
FIG. 2 shows an oblique view of the spring-elastic element.

The membrane 7 is sealingly pressed against the entire circumference of a sealing edge 2b in the area of the fixing site 8 with the aid of a spring-elastic element 9. As can be seen in FIG. 2, the spring-elastic element 9 is substantially configured as an annular disk and, in an outward direction, subdivided into partially circumferential segments 9a having formed thereon finger-shaped and/or claw-shaped extensions 9b. Also a distance 9d between the respective partially circumferential segments 9a is identified, cf. also FIG. 4.

The spring-elastic element 9 is potentially made of a metal, of a metal-containing composite material, a plastic material or a composite material containing plastic. Metals or metal-containing composites are adapted to be segmented in a suitable manner, e.g. by laser cutting, water jet cutting or wire eroding. As regards plastic materials, PEEK will be particularly suitable in view of its temperature resistance.

Figure 3:
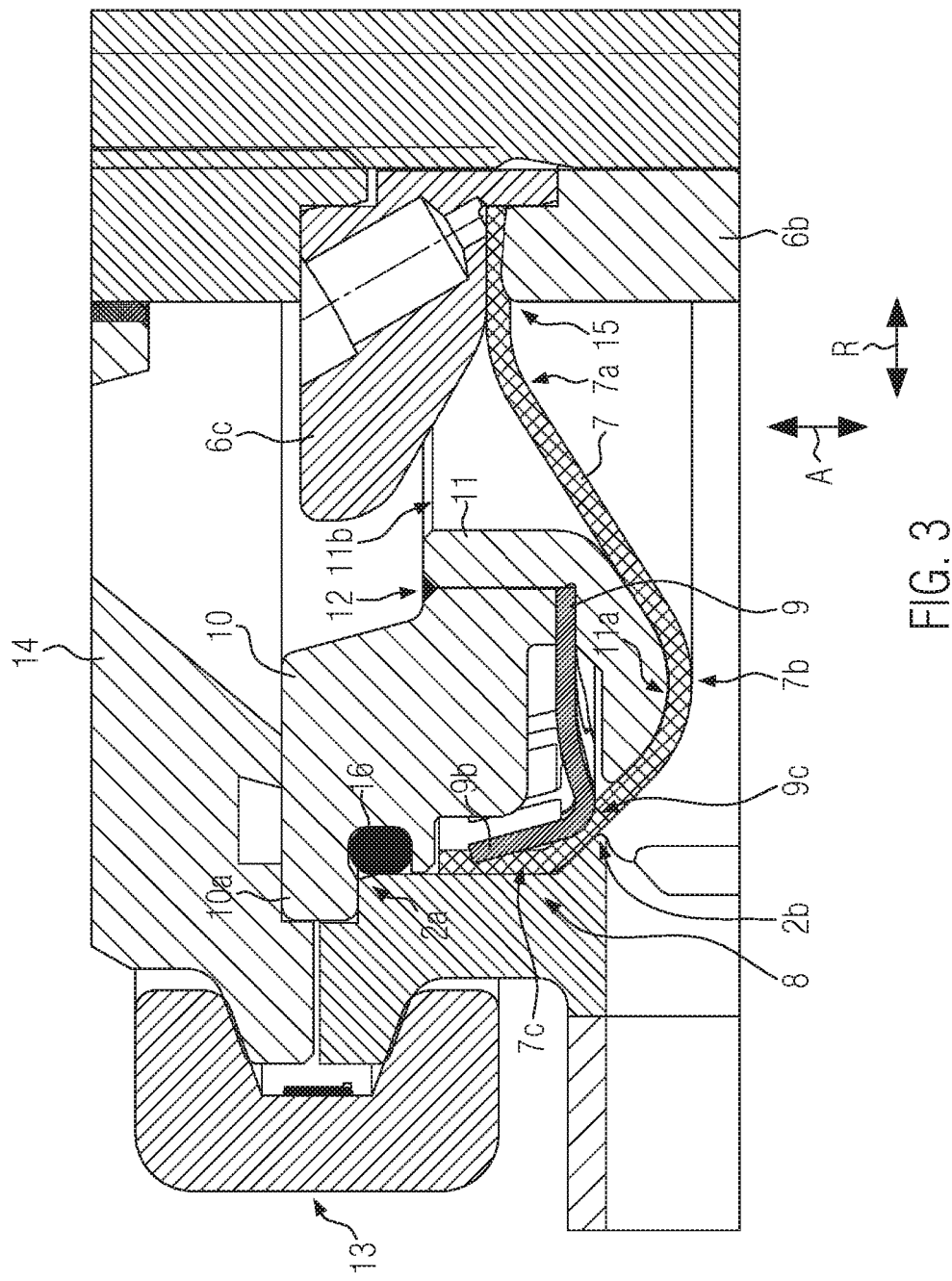
FIG. 3 shows a longitudinal section of a subarea of FIG. 1.
Figure 4:
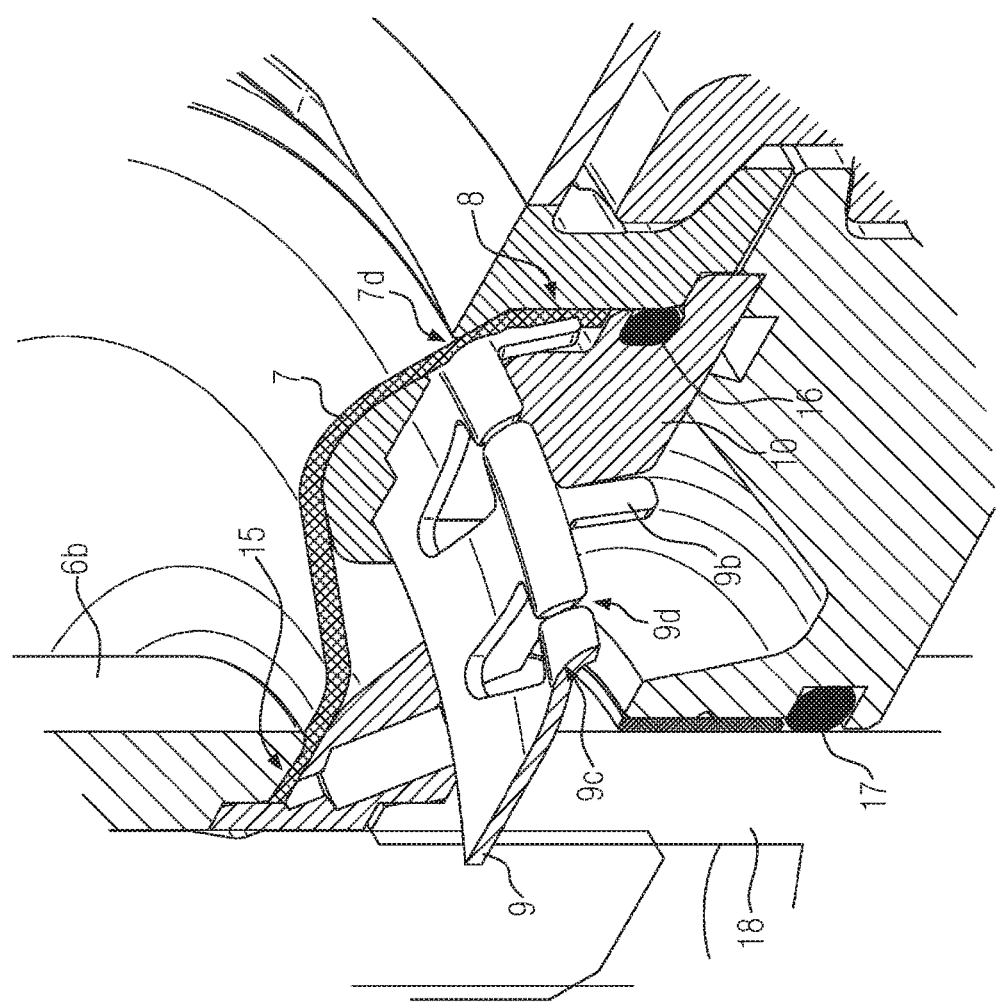
FIG. 4 shows a fragmentary section through the fixing site in an oblique view.

As can be seen in detail from FIGS. 3 and 4, the spring-elastic element 9 is fixingly clamped in position between an anchoring ring 10 and a support ring 11 at least in an axial direction A and potentially also in a radial direction R. To this end, the anchoring ring 10 and the support ring 11 are interconnected at a common connection point 12.

The anchoring ring 10 may comprise on its outside a collar 10a cooperating with a metal stop 2a formed on the valve housing 2 and used for fixing the axial position of the anchoring ring 10 and of the spring-elastic element 9.

Potentially, the metal stop 2a is formed on a flange connection 13 of the valve housing 2 to a neighboring control casing 14 or the like. The control casing 14 serves, in a manner known per se, to axially operate the closing element 6 by means of a pneumatic drive (not shown) or the like. This is known per se and therefore not shown in detail.

The support ring 11 has, on its side facing the valve seat 5, a support profile 11a, which potentially has a convex curvature and on which a radially outer portion 7b of the membrane 7 rests. This serves to maintain a preload in the fixed membrane at different positions of the closing element 6 and, such as in the open condition of the poppet valve 1. Moreover, the mechanical load-bearing capacity of the membrane 7 will be increased by sectionwise support on the support ring 11 and on the support body 6c of the closing element 6.

As can also be seen from FIG. 3, the support body 6c of the closing element 6 can be moved axially through the central opening 11b in the support ring 11. During closing of the poppet valve 1, the support body 6c enters increasingly into contact with the radially inner portion 7a of the membrane 7 and supports the latter while potentially maintaining a preload of the membrane 7. This facilitates a uniform load on the membrane 7 at different positions of the closing element 6.

As can additionally be seen from FIG. 3, the partially circumferential segments 9a have, in an area of contact with the membrane 7, a rounded and/or chamfered sealing profile 9c. In this way, a sealing edge is provided, which extends in segments around the spring-elastic element 9 and which is potentially located in opposed relationship with a sealing edge 2b formed on the valve housing 2. The sealing profile 9c is pressed into the membrane 7 and provides, by compressing the latter, a hermetically tight seal against the valve housing 2. The compression of the membrane 7 through the sealing profile 9c is potentially elastic.

In addition, it can be seen from FIG. 3 that the extensions 9b of the partially circumferential segments 9a project at an oblique angle outwards such that they are directed away from the valve seat 5. By means of the spring tension of the extensions 9b, the latter are pressed into a substantially cylindrical edge portion 7c of the membrane 7 thus deforming the same. By compression or plastic deformation of the membrane 7, a reliable force-fit or form-fit is established between the spring-elastic extensions 9b and the edge portion 7c, the membrane being thus secured against tearing out. Furthermore, the membrane 7 is pressed partially against the fixing site 8, whereby full sealing at the fixing site 8 is prevented, thus allowing leakage detection with respect to the sealing edge 2b.

Further to the above, a form-fit connection of the sealing profile 9c and/or of the extensions 9b with the membrane 7 may also be used at areas, which have been preshaped such that they are adapted to one another. The membrane 7 may have provided thereon complementary recesses (not shown), e.g. in the area of its cylindrical edge portion 7c.

In order to reliably prevent fluid from entering the area behind the sealing edge 2b along the entire circumference of the membrane 7, the distance 9d between the individual partially circumferential segments 9a is, in the contact area with the membrane 7, potentially smaller than the thickness 7d which the fixed membrane 7 has there. This can be seen in FIG. 4, which also shows the substantially non-destructive compression of the membrane 7 through the sealing profile 9c. Tearing of the membrane 7 at the fixing site 8 and, in particular, at the sealing edge 2b is avoided in this way and a reliable force-fit in an axial direction A as well as reliable hermetic sealing are established.

The membrane 7 is, potentially at a fixing area 15 on the side of the closing element, clamped in position between the valve stem 6b and the support body 6c. Due to the substantially radial orientation of the fixing area 15 located on the closing element side, the mechanical load on the disk-shaped membrane 7 is there lower than at the substantially axially oriented fixing site 8 located on the housing side. Moreover, by compressing the membrane 7 between the valve stem 6b and the support body 6c, the hermetic seal relative to the control casing 14 can be established in a comparatively simple manner.

For the sake of completeness, a first sealing ring 16 for circumferentially sealing the anchoring ring 10 on the valve housing 2 and a second sealing ring 16 for sealing a lifting rod 18 against the control casing 14 are shown, said lifting rod 18 being connected to the closing element 6.

The poppet valve 1 described may be configured as a pneumatically driven aseptic seat valve, aseptic double seat valve or aseptic control valve. The poppet valve 1 may be used in a beverage treatment and/or filling plants (not shown). The poppet valve 1 may be connected to aseptic product lines.

The invention claimed is:

1. A poppet valve comprising:
   a valve housing and a valve seat;
   a closing element which cooperates with the valve seat; and
   a membrane extending around the closing element;
   wherein the membrane extends from the closing element to a fixing site located on a side of the valve housing,
   a spring-elastic element which fixes the membrane to the side of the valve housing, wherein the spring-elastic element comprises an annular disk subdivided into partially circumferential segments and extensions, the extensions extending axially and outwards away from the annular disk, wherein the extensions press the membrane against the fixing site.

2. The poppet valve of claim 1, wherein the spring-elastic element is elastically stretched between the closing element and the fixing site.

3. The poppet valve of claim 2, wherein the extensions compress a sealing profile of the membrane against the fixing site.

4. A poppet valve comprising:
   a valve housing with line connections and a valve seat formed therebetween in the valve housing;
   a closing element which is axially displaceable in the valve housing and which cooperates with the valve seat; and
   a membrane extending around the closing element;
   wherein the membrane extends from the closing element to a fixing site located on a side of the valve housing;
   wherein the membrane is elastically stretched between the closing element and the fixing site;
   a spring-elastic element which fixes the membrane to the fixing site,
   wherein the spring-elastic element is an annular disk subdivided into partially circumferential segments formed by extensions extending axially and outwards away from the annular disk; and
   wherein
   the extensions press the membrane against the fixing site and compress the membrane.

5. The poppet valve according to claim 4, wherein the partially circumferential segments have a rounded and/or chamfered sealing profile in a contact area with the membrane.

6. The poppet valve according to claim 4, wherein the extensions project at an oblique angle outwards from the partially circumferential segments such that the extensions are directed away from the valve seat.

7. The poppet valve according to claim 4, wherein a distance between the partially circumferential segments is, in a contact area with the membrane, smaller than a thickness of the membrane at the contact area.

8. The poppet valve according to claim 4, wherein the membrane has a substantially cylindrical outer edge portion, which is clamped in position between the extensions and the fixing site.

9. The poppet valve according to claim 8, wherein the extensions of the spring-elastic element dig into the edge portion deforming the edge portion.

10. The poppet valve according to claim 9, wherein the extensions of the spring-elastic element are configured such that a sealing effect produced between the fixing site and the edge portion of the membrane is not a complete sealing effect.

11. The poppet valve according to claim 4, further comprising an anchoring ring which supports and anchors the spring-elastic element on the valve housing, and a support ring for supporting the membrane under preload, the anchoring ring and the support ring being interconnected in a form-fit manner or by a material bond, so as to fix the spring-elastic element therebetween.

12. The poppet valve according to claim 11, further comprising a metal stop formed on the valve housing and axially anchoring the anchoring ring.

13. The poppet valve according to claim 11, wherein the support ring has a support profile which interacts with the membrane, said support profile having a substantially convex curvature towards the valve seat.

14. The poppet valve according to claim 11, further comprising a support body fixed to the closing element supporting the membrane.

15. The poppet valve according to claim 14, wherein the closing element comprises a valve disk and a valve stem, and the membrane is fixed in position between the valve stem and the support body.

16. The poppet valve according to claim 4, wherein the spring-elastic element consists of a metal or a metal-containing composite material.

17. The poppet valve according to claim 4, wherein the spring-elastic element consists of a plastic material or of a composite material containing plastic.

18. The poppet valve according to claim 17, wherein the plastic material or the composite material containing plastic is temperature resistant up to at least 150° C.

19. The poppet valve according to claim 4, which is configured for a pneumatically driven aseptic seat valve, an aseptic double seat valve, or an aseptic control valve.

20. The poppet valve according to claim 4, wherein the poppet valve is used in a beverage treatment or filling system.

* * * * *